Sept. 22, 1953  E. F. KUBLER  2,653,288
THYRATRON CONTROL SYSTEM FOR SERIES MOTORS
Filed July 19, 1951

Inventor:
Ernest F. Kubler,
by
His Attorney.

UNITED STATES PATENT OFFICE 2,653,288

THYRATRON CONTROL SYSTEM FOR SERIES MOTORS

Ernest F. Kubler, Schenectady, N. Y., assignor to General Electric Company, a corporation of New York Application July 19, 1951, Serial No. 237,531

7 Claims. (Cl. 318—249)

This invention relates to control systems, more particularly to control systems for direct current motors and it has for an object the provision of a simple, reliable and improved control system of this character.

More specifically the invention relates to electric control systems for series motors and a more specific object of the invention is the provision of a system of this character in which the speed of the motor is maintained substantially constant without using a tachometer generator driven by the motor to produce a speed signal voltage.

A further object of the invention is the provision of an electric control system for a series motor by means of which a preset speed may be maintained automatically at the preset value over a wide range of load torque within the regulating limits of the electric valve rectifier used to supply the motor.

In carrying the invention into effect in one form thereof a series wound direct current motor is supplied from a controlled diametric rectifier. A reference voltage proportional to the magnetic flux of the field is derived from the current flowing in the armature circuit of the motor and a speed signal voltage is derived from the armature voltage of the motor. These two voltages are compared by means of a voltage comparison circuit and a voltage equal to the difference or some fraction of the difference of these two voltages, is supplied to the input control circuit of the rectifier to cause it to vary the voltage supplied to the motor to maintain a constant relationship between the armature voltage and the armature current. The relationship between the armature current and field flux of series motors having relatively large air gaps is fairly linear.

The relationship between the field flux and armature current of series motors with relatively short air gaps is not linear, with the result that the speed of the motor does not remain constant even though a constant relationship between the armature voltage and current is maintained. In a modification, means are provided for compensating for the non-linearity of the relationship between the armature current and field flux in control systems intended for use with series motors having relatively short air gaps.

For a better and more complete understanding of the invention reference should now be had to the following specification and to the accompanying drawings of which Fig. 1 is a simple, schematic sketch of an embodiment of the invention; Fig. 2 is a simple, schematic sketch of a compensating unit which may be used with the embodiment illustrated in Fig. 1 to compensate for the non-linearity between the field flux and armature current of series motors having relatively short air gaps, and Fig. 3 is a chart of characteristic curves which facilitate an understanding of the operation of the modified system including the compensating unit.

Referring now to the drawing, a direct current series motor 1 having an armature 1a and a series field winding 1b is supplied from a controlled rectifier. This rectifier is illustrated as comprising a pair of electric valves 2 and 3 having a diametric connection to the secondary winding 4a of a supply transformer 4, of which the primary winding 4b is connected to be supplied from a suitable source of alternating voltage such as the supply conductors 5 and 6. Although the valves 2 and 3 may be of any suitable type, they are preferably of the grid controlled gas type such for example as the well known GL5545 thyratron. They are provided with anodes 2a and 3a, cathodes 2b and 3b and control electrodes 2c and 3c respectively.

The anode 2a is connected to one terminal of the secondary winding 4a of the supply transformer and the primary windings 7a and 8a of the two current transformers 7 and 8 respectively are connected in series relationship with each other in the anode connection. Each of these current transformers has a second primary winding on its core and these additional primary windings 7b and 8b are connected in series relationship between the anode 3a and the other terminal of the supply transformer. The cathodes 2b and 3b are connected together to constitute the positive supply bus to which one terminal of the motor is connected while the opposite or field terminal of the motor is connected by means of conductor 9 to the mid-tap of the secondary winding 4a.

For the purpose of controlling the conductivity of the thyratrons 2 and 3 a phase shifting bridge network is provided for varying the phase relationship between the anode voltages and the voltages supplied to the control electrodes. This phase shifting network is illustrated as comprising the secondary winding 10a of the transformer 10, the reactance winding 11a of a saturable reactor 11, a resistor 12 and the primary winding 13a of a control electrode transformer 13. Primary winding 10b of the bridge network transformer 10 is connected to be supplied from the same source as that from which the supply transformer 4 is supplied i. e. the source represented by supply conductors 5 and 6. As shown, the primary winding 13a of the control electrode transformer is connected across opposite points of the bridge network i. e. from the mid-point of the secondary winding 10a to the junction point of the reactance winding 11a and the resistor 12. The transformer 13 is provided with two secondary windings 13b and 13c which as illustrated are connected between the cathodes 2b and 3b and the control electrodes 2c and 3c respectively of the thyratrons 2 and 3.

For the purpose of maintaining a constant relationship between the armature voltage and the armature current under various load conditions a signal voltage which is derived from the armature voltage is compared with a reference voltage which is obtained from the armature current. This reference voltage is obtained by means of the curent transformer 7 and a double diode rectifier valve 14 having a pair of anodes 14a and 14b and a cathode 14c. Although the valve 14 may be of any suitable type it is preferably a GT6X5. The anodes 14a and 14b are respectively connected to opposite terminals of the secondary winding 7c of the current transformer of which primary windings 7a and 7b are respectively connected in the anode circuits of the thyratrons 2 and 3. Between the cathode 14c and the mid-tap of the secondary winding 7c a fixed resistor 15 and a potentiometer 16 are connected in series relationship with each other. The junction point 15a between the resistor 15 and potentiometer 16 is connected to the negative terminal of the motor armature 1a. A capacitor 17 is connected in parallel with the potentiometer 16 and a variable resistor 18 is connected between the cathode 14c and the mid-tap of the secondary winding 7c.

The voltage which is induced in the secondary winding 7c of current transformer is proportional to the armature and series field current of the motor and for series motors with relatively long air gaps it is proportional to the field flux. This voltage is rectified by means of the rectifier valve 14 and the rectified voltage is applied across the resistor 15 and potentiometer 16 which are connected in series relationship.

For the purpose of obtaining a signal voltage proportional to the armature voltage a voltage divider is connected across the armature 1a. This voltage divider is illustrated as comprising a fixed resistor 19 and a potentiometer 20 connected in series relationship with each other. A capacitor 21 is connected in parallel with potentiometer 20.

As a result of the connections described in the foregoing the voltage across potentiometer 16 is proportional to the armature current of the motor and the voltage across the potentiometer 20 is proportional to the armature voltage of the motor. Slider 16a on the potentiometer 16 selects a portion of the voltage across the potentiometer as a reference voltage and a corresponding slider 20a on the potentiometer 20 selects a portion of the voltage across this potentiometer as a signal voltage. The reference voltage and the signal voltage are compared with each other by means of a voltage comparison circuit which includes the active portions of the potentiometers 16 and 20 and fixed resistors 22 and 23 which are connected in series relationship with each other between the sliders 20a and 16a. Since each of the potentiometers has a terminal connected to the common point 15a, the voltage between this common point and the junction point 22a of the resistors 22 and 23 is equal to a fraction of the difference of the voltages between the common point 15a and the sliders 16a and 20a respectively. This fraction depends on the ratio of the resistances of resistors 22 and 23.

This difference voltage which appears between the common point 15a and the junction point 22a is amplified by suitable means such as the two stage electronic amplifier illustrated in the drawings as comprising a first stage amplifier valve 24 and a second stage amplifier valve 25. Although the valves 24 and 25 may be of any suitable type the valve 24 is preferably a 6SL7 valve and valve 25 is preferably a 6SN7 valve.

A rectified voltage is supplied to both stages of the amplifier by means of a voltage doubler circuit which is illustrated as comprising a secondary winding 26a of a transformer, two pairs of selenium stack rectifiers 27 and 28 and capacitors 29 and 30 connected in series relationship with each other. The common terminal of the capacitors 29 and 30 is connected to one terminal and the outside terminals of the capacitors are connected through the reversely connected rectifiers to the opposite terminal of the secondary winding 26a. As a result of the connections described, the rectified voltage which appears across the buses 31 and 32 is approximately double the peak to peak voltage of the secondary winding 26a. The voltage between the intermediate voltage bus 15a and the negative voltage bus 32 is substantially half the voltage between the positive bus 21 and the negative bus 32.

The anode 24a of the first stage valve is connected through a voltage drop resistor 33 to the positive voltage bus 31 and the cathode 24b is connected to the intermediate voltage bus 15a while the control electrode 24c is connected through a resistor 34 to the intermediate point 22a of the voltage comparison circuit. Thus the voltage between the points 15a and 22a which is a fraction of the difference of the reference and signal voltages is applied between the cathode 24b and the control electrode 24c.

The anode 25a of the second stage valve is connected through the saturating control winding 11b of the saturable reactor 11 of the phase shifting network and a resistor 35 to the positive voltage bus 31 and the cathode 25b is connected to the intermediate voltage bus 15a. A voltage divider comprising serially connected resistors 36 and 37 is connected between the anode connection terminal 33a of resistor 33 and the negative voltage bus 32. The control electrode 25c is connected to the intermediate voltage terminal 36a of this divider.

A potentiometer 38 is connected between the intermediate voltage bus 15a and the negative voltage bus 32, and the grid 24c of the first stage valve is connected through a resistor 39 to slider 38a of this potentiometer. Initially, the slider 38a is set in a position in which a negative bias is applied to control electrode 24c of such a magnitude that the valve 24 is conducting a small amount of current.

The operation of the amplifier is as follows: Assuming that the first stage valve 24 is biased in the region of cut-off, it conducts a small amount of current and the voltage drop across resistor 33 is correspondingly small with the result that the voltage of the intermediate point 36a and of the control electrode 25c is approximately at its maximum positive value with respect to the voltage of the cathode 25b. Consequently, the valve 25 is turned nearly full on and a large current flows in the saturating winding 11b of the phase shifting saturable reactor. As a result, the phase of the voltage supplied from the phase shifting network to the control electrodes of thyratrons 2 and 3 is advanced so that the anode voltages and control electrode voltages are nearly in phase and the thyratrons are supplying maximum current to the armature and series field circuit of the motor.

A positive increase in the voltage between the conductor 15a and the terminal 22a makes the voltage of the control electrode 24c less negative and increases the conduction of the valve 24 and correspondingly increases voltage drop across resistor 33. This results in making the voltage of control electrode 25c of the second stage valve more negative thereby decreasing current flowing in the saturating winding 11b. As a result, the phase of the voltages supplied to the control electrodes of thyratrons is retarded with respect to anode voltages and the voltage supplied by the thyratron to the motor is correspondingly reduced.

With the foregoing understanding of the elements and their organization the operation in the system itself will be readily understood from the following detailed description. It is assumed that the motor 1 is energized and that the system is in a balanced condition such that the motor is driving its load at a substantially constant speed the magnitude of which is determined by the load and the settings of the control potentiometers 16 and 20. Any change in the load while other conditions remain unchanged will cause a variation in the speed of the motor and a corresponding variation in the ratio between the armature voltage and the armature current which produces a corresponding variation in the difference between the voltages of the active portions of the potentiometers 16 and 20. This variation of the difference between the reference voltage and the signal voltage is amplified by the amplifier 24, 25, and in turn produces a corresponding change in the current flowing in the saturating winding 11b. As a result, the output of the thyratrons is changed in a direction which corrects the original change in the ratio between the armature current and the armature voltage and restores the speed of the motor to substantially the value which existed before the change in the load occurred.

For example, assume that the load on the motor is suddenly increased. The speed of the motor will tend to decrease and bring about a corresponding decrease in armature voltage. This results in changing the ratio between the voltages across the active portions of the potentiometers 16 and 20 in a direction such that the voltage of the control electrode 24c is made more negative. The ultimate result is that the phase of the voltages supplied to the control electrodes to the thyratrons is advanced and the voltage supplied to the motor is correspondingly increased. This corrective action continues but with progressively decreasing magnitude until the equilibrium of the system is restored with the ratio between the armature current and the new value of armature voltage restored to substantially the ratio which existed before the load increase occurred. As a result the speed of the motor will be restored to substantially the value which existed prior to the increase in load.

That constant speed of the motor will result from maintaining a constant relationship between the armature voltage and the armature current of a series motor is shown by the following equations. The voltage across the armature is proportional to the motor speed and the field flux. In other words (1) $$E = K_1 SF$$

in which $E$ = Armature voltage
$S$ = Motor speed
$F$ = Field flux
$K_1$ = Proportionality constant With no saturation in the field poles, the field flux is proportional to the armature current as shown by (2) $$F = K_2 I$$

in which $K_2$ = Proportionality constant
$I$ = Armature current

Consequently, the armature voltage is proportional to the product of the speed and the armature current as represented by (3) $$E = K_1 K_2 SI = KSI$$

(4) $$\text{Motor speed } S = \frac{E}{KI}$$

in which $K$ is another constant equal to the product $K_1$ and $K_2$.

The last Equation 4 indicates that the speed of a series motor is held constant under various load conditions if the armature voltage is held in constant proportion to the armature current.

With the position of the slider of the potentiometer 20 remaining fixed, a change in the position of the slider of the potentiometer 16 will result in a change in the ratio of the signal and reference voltages and consequently a change in the motor speed will occur. The potentiometer 20 is used to adjust maximum motor speed when potentiometer 16 is, itself, set at maximum value.

For series motors having relatively short air gaps, the relationship between the field flux and the armature current is not as linear as Equation 2 indicates. The field poles tend to become saturated with increasing armature current and therefore the field flux remains smaller than the value called for by the armature current. In other words, the field flux is less than it would be if the linear relationship of Equation 2 existed. This condition becomes worse as the load current increases, causing the motor to over speed with heavy loads.

In order to compensate for the above nonlinearity of the relationship between the field flux and the armature current, means are provided for reducing the reference voltage in correspondence with the increasing saturation of the field poles, thereby counteracting the tendency of the motor to over speed as a result of the deviation from the linear relationship between the field flux and the armature current. This means is illustrated in Fig. 2 as a network comprising a saturable reactor 40 in series with a full wave selenium stack rectifying bridge 41 provided with leads 42 and 43 which are adapted to be connected to the terminals of the secondary winding 7c of the current transformer.

The rectified reactor current flows through a network consisting of the reactor saturating winding 40a and potentiometer 44 with which the saturating winding is connected in parallel. The relationship between the voltage across the reactance winding 40b of the saturable reactor and the current flowing in the secondary winding 7c of the current transformer is represented by the family of curves 45, 46, 47, 48 and 49 in Fig. 3. In these curves ordinates represent volts across the reactance windings and volts across the secondary winding 7c and also represent the reference voltage, and abscissae represent amperes flowing in the current transformer 7. When the slider of the potentiometer 44 is turned to the zero position i. e. the position in which the resistance element is entirely short-circuited, no D.-C. current flows through the saturating winding 40a of the saturable reactor and the saturation curve of the reactor is represented by the curve 45 in Fig. 3.

If the potentiometer slider 44a is turned to insert a predetermined amount of the resistance element, then part of the rectified reactor current will flow through the saturating winding 7c causing the reactor to saturate earlier as the armature current increases. Various saturation curves are obtained for various resistance values for potentiometer 44 as illustrated by curves 46, 47, 48, and 49.

As shown, increasing the resistance of the potentiometer 44 will cause the reactor to saturate earlier. Saturation of the reactor depends on the potentiometer 44 and also on the current in the reactance winding. The current in the reactance winding depends in part on the magnitude of the resistor 18 which is connected in the output circuit of the diode rectifier 14 in the secondary circuit of the current transformer. The point with respect to the magnitude of the current flow in the current transformer at which the reactor starts to saturate also depends on the magnitude of resistor 18.

The potentiometer 44 provides a compensating means for the non-linearity of the flux in the field poles by reducing the magnitude of the reference voltages corresponding to each value of armature current below the value that it would have if the relationship between the field flux and armature current were perfectly linear. In other words, compensation is provided by causing the reference voltage to deviate from a linear relationship to the armature current to correspond to the deviation of the field flux from a linear relationship to armature current. Consequently, the motor operation is improved so that for all practical purposes the speed is maintained constant with increasing loads. An increase in resistance of the resistor 18 increases the output voltage of the current transformer and consequently increases the full load reference voltage across the potentiometer 16. In order to maintain the rated maximum speed of the motor the potentiometer 20 must be readjusted each time the resistor 18 is changed.

The point with respect to current flowing in the current transformer at which the saturable reactor starts to saturate is independent of the voltage across the current transformer and because of this a change in the resistor 18 provides a means to change the value of the speed at which the non-linearity begins. From the foregoing it will be seen that as the armature current of the motor increases and the field poles tend to saturate and increase the speed of the motor above the preset value, the compensating unit reduces the reference voltage sufficiently to maintain the speed of the motor constant with increasing loads.

The operation of this system to maintain constant speed of the motor is based on a comparison of the armature terminal voltage, as a measure of speed, with a reference voltage. However, owing to the RI drop in the armature, the armature terminal voltage is not a true measure of the motor speed. Compensation for the error resulting from the RI drop is provided by supplying to the voltage comparison circuit a voltage equal to the RI drop and which is either added to the reference voltage or subtracted from the speed signal voltage. This is accomplished by means of an RI drop compensating unit which comprises the current transformer 8, a double diode rectifying valve 50, a resistor 51, a potentiometer 52 and a resistor 53. Although the valve 50 may be of any suitable type it is preferably a GT6X5. Its anodes are connected to opposite terminals of the secondary winding 8c of the current transformer and its cathodes are connected together and through the resistor 51 and potentiometer 52 in series to the mid-tap of the secondary winding 8c. The junction point of the resistor 51 and the potentiometer 52 is connected to the negative armature terminal of the motor which as previously pointed out is connected to the bus 15a. Between the slider 52a of the potentiometer and the intermediate point 22a of the voltage comparison circuit the resistor 53 is connected. A capacitor 54 is connected in parallel with potentiometer 52.

Slider 52a is adjusted to a point on the potentiometer 52 at which there is supplied to the voltage comparison circuit a corrective voltage which adds to the reference voltage and which compensates for the RI drop. The result of adding the corrective voltage to the reference voltage is that the voltage of the control electrode 24c of the first stage amplifier valve is made more negative. The ultimate result of this is that the phase of the voltages supplied to the control electrodes 2c and 3c of the thyratrons is advanced with respect to the anode voltages and the voltage supplied to the motor is correspondingly increased an amount sufficient to counteract the error resulting from the RI drop in the motor armature.

Although the values of the electrical constants of the circuit elements are not critical, the following values for the resistors and capacitors of the system have been found to give satisfactory operation:

Resistors: Megohms
| | |
|---|---|
| 12 | .005 |
| 15 | .025 |
| 16 | .025 |
| 18 | .015 |
| 19 | .02 |
| 20 | .1 |
| 22 | .5 |
| 23 | .25 |
| 33 | .15 |
| 34 | .3 |
| 35 | .02 |
| 36 | .75 |
| 37 | .5 |
| 38 | .25 |
| 39 | 5.0 |
| 51 | .05 |
| 52 | .025 |
| 53 | 2.0 |

Capacitors: Microfarads
| | |
|---|---|
| 17 | 1 |
| 21 | 1 |
| 29 | 5 |
| 30 | 5 |
| 54 | 1 |

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. An electronic motor control system comprising in combination a direct current series motor, means including a controlled rectifier for supplying a rectified current to the armature circuit of said motor, means for deriving substantially entirely from said current a reference voltage proportional thereto, means for deriving a signal voltage from the armature terminals of said motor, and electric valve means responsive substantially solely to the difference of said derived voltages for controlling said rectifier to maintain a constant ratio between said armature current and said armature voltage to maintain the speed of said motor substantially constant under varying load.

2. An electronic motor control system comprising in combination a direct current series motor, means including a controlled rectifier for supplying a rectified current to the armature circuit of said motor, means for deriving substantially entirely from said current a reference voltage proportional thereto, means for deriving a signal voltage from the armature voltage of said motor, and means including a voltage comparison circuit responsive substantially solely to the difference of said derived voltages for controlling said rectifier to maintain a constant ratio between said armature voltage and armature current to maintain the speed of said motor substantially constant under varying load.

3. An electronic motor control system comprising in combination a direct current series motor, means including a controlled rectifier for supplying a rectified current to the armature circuit of said motor, means for deriving substantially entirely from said current a reference voltage corresponding in magnitude thereto, means for deriving from the armature voltage of said motor a signal voltage corresponding in magnitude thereto, and electric valve means responsive substantially solely to the difference of said reference voltage and said signal voltage for controlling said rectifier to maintain a constant ratio between said current and said armature voltage to maintain the speed of said motor substantially constant under varying load.

4. An electronic motor control system comprising in combination a direct current series motor, a controlled rectifier for supplying rectified current to the armature circuit of said motor comprising electric valve means provided with an anode, a cathode and a control electrode, electrical connections for deriving substantially entirely from said current a reference voltage having a magnitude corresponding to the magnitude of said current, additional electrical connections for deriving from the armature voltage of said motor a signal voltage corresponding in magnitude to the magnitude of said voltage, a voltage comparison circuit connected to said electrical connections and an amplifier connected to said comparison circuit and responsive substantially solely to the difference of said reference voltage and said signal voltage for supplying a control voltage to said control electrode to cause said rectifier to maintain a constant ratio between said current and said armature voltage to maintain the speed of said motor substantially constant under varying load.

5. An electronic motor control system comprising in combination a direct current series motor, a controlled rectifier for supplying a rectified current to the armature circuit of said motor, means for deriving substantially entirely from said current a reference voltage having a non-linear relationship to said current generally corresponding to the non-linear relationship between the magnetic flux of said motor and said current, means for deriving a signal voltage from the armature voltage of said motor, and means including a voltage comparison circuit responsive substantially solely to the difference of said derived voltage for controlling said rectifier to maintain a constant ratio between said armature voltage and armature current to maintain the speed of said motor substantially constant under varying load.

6. An electronic motor control system comprising in combination a direct current series motor, a controlled rectifier for supplying a rectified current to the armature circuit of said motor, means for deriving substantially entirely from said current a reference voltage proportional thereto comprising a current transformer having a primary winding in circuit with the main discharge supporting electrodes of said rectifier and a secondary winding, a saturable reactor connected in a circuit across said secondary winding for modifying said derived reference voltage to have a non-linear relationship to said current corresponding approximately to the non-linear relationship between the magnetic flux of said motor and said current, means for deriving a signal voltage from the armature of said motor, and means including a voltage comparison circuit connected to be responsive substantially solely to the difference of said reference voltage and said signal voltage for controlling said rectifier to maintain a constant ratio between said armature voltage and armature current to maintain the speed of said motor substantially constant under varying load.

7. An electronic motor control system comprising in combination a direct current series motor, a controlled rectifier for supplying rectified current to the armature circuit of said motor comprising electric valve apparatus provided with an anode, a cathode and a control grid, means for deriving substantially entirely from said current a reference voltage proportional thereto comprising a current transformer having a primary winding connected in circuit with said anode and cathode and a secondary winding, a first potentiometer connected in circuit with said secondary winding, means for modifying said reference voltage to have a non-linear relationship to said current corresponding approximately to the non-linear relationship between the magnetic flux of said motor and said current comprising a saturable reactor having a reactance winding connected in a circuit across said secondary winding, and a saturating control winding, a rectifier connected in circuit with said reactance winding for supplying an exciting current to said control winding, a second potentiometer, means for supplying to said second potentiometer a signal voltage derived from the armature voltage of said motor and a voltage comparison circuit including said potentiometers and responsive substantially solely to the difference of said reference and signal voltages for supplying to said grid and cathode a voltage proportional to said difference to maintain a constant ratio between said armature voltage and armature current to maintain substantially constant speed of said motor under varying load.

ERNEST F. KUBLER.

References Cited in the file of this patent

UNITED STATES PATENTS

| Number | Name | Date |
|---|---|---|
| 2,082,496 | Howe | June 1, 1937 |
| 2,358,394 | Haug | Sept. 19, 1944 |
| 2,488,536 | Haneiko | Nov. 22, 1949 |